Jan. 18, 1944.  D. B. LUTEN, JR  2,339,576
SEPARATION OF PHENOLS FROM THIOPHENOLS
Filed April 28, 1941
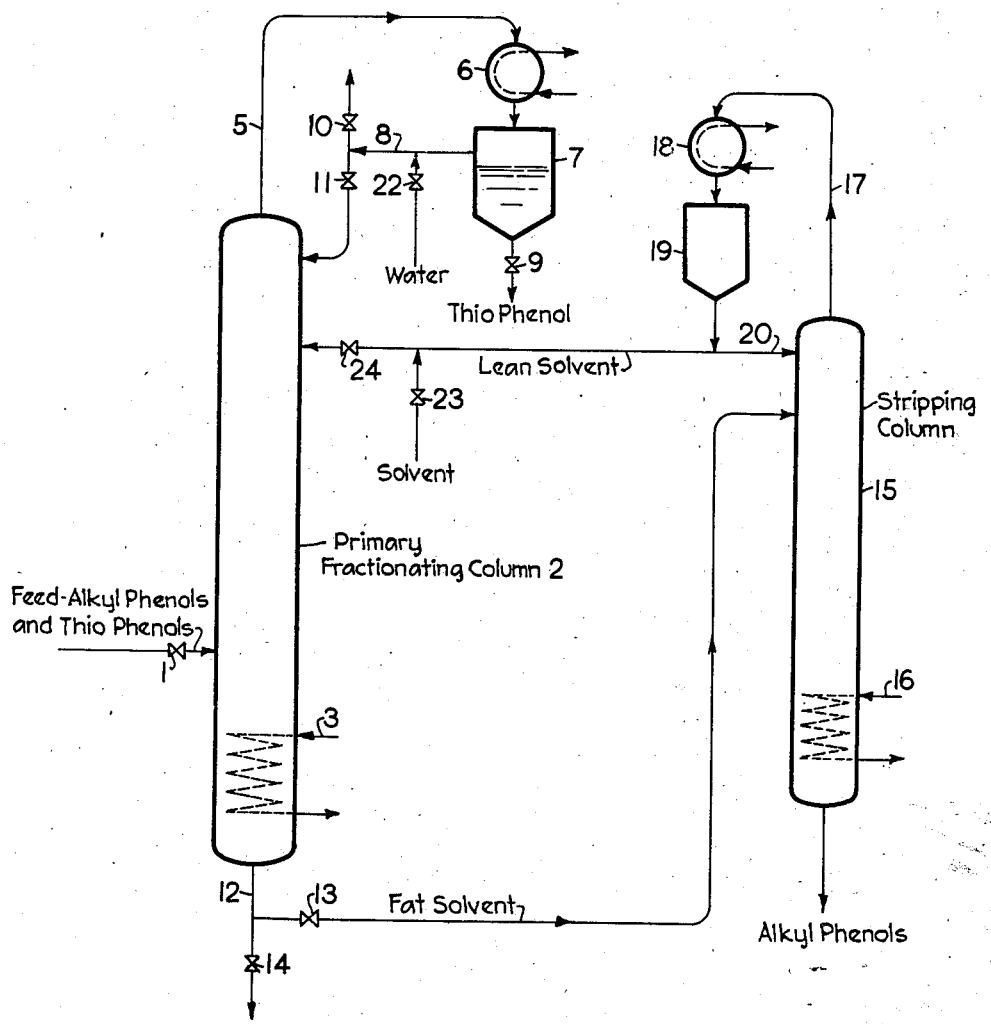
Inventor: Daniel B. Luten, Jr.
By his Attorney:

Patented Jan. 18, 1944

2,339,576

UNITED STATES PATENT OFFICE 2,339,576

SEPARATION OF PHENOLS FROM THIO-
PHENOLS

Daniel B. Luten, Jr., Berkeley, Calif., assignor to
Shell Development Company, San Francisco,
Calif., a corporation of Delaware Application April 28, 1941, Serial No. 390,779

13 Claims. (Cl. 202—42)

This invention relates to a process for separating phenols and thiophenols from their mixtures by distillation processes. More particularly, it relates to a separation of these components by distillation processes wherein certain auxiliary agents are employed. The term "phenols" as used herein refers to mono-hydroxy aromatic compounds such as phenol and various alkylphenols, such as the cresols, the ethyl phenols, the xylenols, polyhydroxy phenols such as catechol, resorcinol, etc., and mixtures thereof. The term "thiophenol" refers to aromatic mercaptans such as thiophenol, the methyl thiophenols, and the like.

Alkylphenols and thiophenols may be derived from petroleum and coal tar sources and have many uses, for example, as gum inhibitors, disinfectants, insecticides, flotation reagents, intermediates in organic synthesis, and the like. For most uses, they must be in a reasonably pure state, and their separation is often a difficult matter due to the similarity of most of their properties.

It is an object of my invention to separate alkylphenols from thiophenols by means of a distillation process. It is another object to recover phenols and thiophenols from mixtures thereof without permanently altering either component, thereby producing alkylphenols and thiophenols of high purity.

Heretofore it has not normally been possible to separate satisfactorily by distillation thiophenols and phenols of approximately the same number of carbon atoms, due to the similarity of their vapor pressures, without employing excessively large numbers of plates and excessively high reflux ratios. I have now discovered that mixtures of thiophenols and phenols can be effectively separated by distilling mixtures of them in the presence of certain selective solvents. I may carry out my invention as follows: A mixture of phenols and thiophenols to be separated is distilled in the presence of a selective solvent for the phenols. This reduces the relative vapor pressure of the phenols which remain behind in the column while the thiophenols pass overhead.

A more preferable modification of the process comprises distilling in the presence of water in addition to the solvent. The water forms azeotropes with the thiophenols, thus assisting their passage overhead. In some cases the water may serve both as an azeotrope former and as a selective solvent. For example, phenol and thiophenol mixtures can be cleanly separated by distilling them in the presence of liquid water. In this case the water acts both as the solvent for the phenol, thus reducing its relative vapor pressure, and at the same time it forms azeotropes with the thiophenol thus serving a dual purpose.

My process can be carried out in a batch still or in a continuous fractionating system. Although the solvent may merely be mixed with the feed to the column, I prefer to let the solvent flow down the column as the distillation proceeds. Likewise, liquid water may be added to the feed, or preferably be admitted as steam to the column, provided some liquid selective solvent is present during the distillation to lower the relative vapor pressure of the phenols.

The accompanying drawing is a flow diagram of the process of this invention.

Referring to this drawing, representing a flow diagram of a continuously operated embodiment of the process: the feed, comprising a mixture of alkyl phenols and thiophenols preferably having a boiling range not exceeding about 50° C., is fed via line 1 to primary fractionating column 2 equipped with reboiler 3. The heat supplied to column 2 by reboiler 3 is so regulated, and the quantity of solvent and water admitted via valved line 24 is so regulated, that the mixture boils but there is always liquid solvent present in the bottom product. Vapors pass upward through the column countercurrently contacting the solvent and water admitted through line 24, and the reflux admitted by valved line 11, selectively dissolving the alkyl phenols while the water at the same time assists the passage of thiophenols overhead as azeotropes. The vapors from column 2 pass overhead via line 5 to condenser 6. Condensed vapors collect in accumulator 7 wherein phase separation occurs, an upper phase comprising water and a lower phase comprising thiophenol, which latter may be withdrawn continuously or from time to time via valved line 9 and pass to storage not shown. All or a portion of the upper aqueous phase containing primarily water and sometimes a small quantity of solvent, in cases where the solvent employed has a relatively low boiling point, passes back as reflux to column 2 via line 8 and valved line 11 (valves 10 and 11 being properly regulated). The portion of solvent not returned as reflux is withdrawn from the system via valved line 10.

From the bottom of column 2 is withdrawn via line 12 and valved line 13 (valve 14 being closed) fat solvent and water containing dissolved alkyl phenols which pass to stripping column 15 provided with reboiler 16. Herein alkyl phenols are separated from water and solvent, which pass overhead via line 17 to condenser 18. Condensed vapors collect in accumulator 19, a portion of which is returned to stripping column 15 via line 20 as reflux, while the remaining lean solvent and water are returned to column 2 for use in another cycle, via valved line 24. The above description of the separation of solvent from alkyl phenols applies only to separations in cases where the solvent boils at a temperature lower than the boiling point of the phenols to be separated. In cases where the solvent boils higher than alkyl phenols, other suitable distillation systems may be employed for the separation of solvent and alkyl phenols.

In case the separation is to be carried out in a batch process, valves 13, 14 and 24 are closed and the column is charged with a mixture of alkyl phenols, thiophenols, water and solvent via valved line 1. Valve 1 is closed and the mixture is distilled taking overhead vapors of thiophenols and water and a small portion of solvent, in cases where the solvent boils at a relatively low temperature, through line 5. These vapors are condensed in condenser 6 and pass to accumulator 7, wherein initially phase separation takes place. The lower thiophenol layer is withdrawn at intervals through valve 9, with the upper aqueous layer being returned to column 2 via lines 8 and 11, valve 10 being closed. The distillation is continued until no further phase separation occurs in accumulator 7. Then the alkyl phenols are withdrawn from the system via line 12 and valved line 14 to separate solvent from dissolved alkyl phenols in a suitable distillation system, the operation of which will depend upon whether the solvent boils higher or lower than the alkyl phenols to be separated.

Sometimes it is advantageous to carry out the distillation under pressure other than atmospheric, for example, when it is desired to separate higher alkylphenols and thiophenols, and to employ water both as the solvent and as the azeotrope-forming substance. A pressure of about 200 pounds per sq. in. substantially increases the solvent power of the water for the phenols at the higher temperature, while still permitting the water to form azeotropes with the thiophenols which pass overhead. Sometimes it is desirable to operate under vacuum to alter the azeotropic vapor composition.

The process, when employing both an organic solvent and water, may be illustrated by a separation of cresols from methyl thiophenols in this manner. The still is charged with a mixture of the phenols, thiophenols, water and acetic acid as the selective solvent, and the mixture is distilled. Under these conditions an azeotrope comprising methyl thiophenol and water passes overhead and separates upon cooling into two layers, an upper water layer and a lower thiophenol layer, the former of which may be returned to the still as reflux while the acetic acid and cresols stay behind. The acetic acid and phenols may be easily separated in a subsequent distillation step to give pure phenols and acetic acid, the latter of which may be used again.

Solvents which are suitable for my process possess the following properties: (1) they are at least partially miscible with water, i. e., 100 gms. of water dissolve at least about 10 gms. of the solvent at room temperature; (2) they are stable under the conditions of the process; (3) they preferably though not necessarily form weak molecular complexes with the phenols and not the thiophenols; (4) they boil at temperatures sufficiently different from the phenols under treatment to enable their separation from the latter by distillation without excessive reflux or plate requirements; (5) they boil at temperatures not much below the boiling temperature of water so that there is always liquid solvent present during the distillation to reduce the relative vapor pressure of the phenols; (6) they preferably but not necessarily should not form low boiling azeotropes which tend to distill overhead. Although considerable amounts of solvent can be tolerated in the overhead distillate, when using such solvents it is frequently necessary to add some substance to cause demixing of the distillate into two layers to separate a thiophenol layer and a solvent-water layer. The latter may be returned to the column as reflux.

Solvents which I have found suitable include alkanol amines, such as monoethanol amine, triethanol amine, diamino isopropanol; glycols such as ethylene glycol, 1,2-propylene glycol, diethylene glycol, triethylene glycol, isobutylene glycol; glycerols such as glycerol; alkyglycerols of from four to ten carbon atoms such as methyl glycerol, etc.; mixed ether alcohols such as ethylene glycol monomethyl, ethyl or propyl ethers; monocarboxylic acids, preferably of less than five carbon atoms, for example, formic, acetic, and lactic acids; dicarboxylic acids, preferably of less than seven carbon atoms, such as succinic and adipic acids; halogenated acids such as chloracetic, chlorpropionic, etc.; substances other than carboxylic acids which are known to form weak complexes with phenols, such as morpholine, etc.; amides such as acetamide, etc.; lactams such as alpha piperidone; and nitriles such as acetonitrile, etc. Mixtures of the above with water and/or each other, are also valuable for use in this connection. While any of these substances may be employed, I prefer to use acetic acid because of its high efficiency, low cost and ready availability.

The most suitable amount of solvent to use depends upon the particular phenols and thiophenols being separated. There should be enough solvent so that there is always some liquid solvent present even though some of it may pass overhead as vapor or as azeotrope. In general it is desirable to employ an amount providing liquid in excess of that which would be equivalent to the alkylphenols present on a mol to mol basis. The amount of water to employ as an azeotrope former depends to a large degree upon the composition of the azeotrope passing overhead, which can be determined for any given azeotrope. In a continuous distillation it is preferable to employ approximately the same amount of water as normally occurs in the azeotrope to prevent accumulation of water in the still. In a batch distillation the top water layer of distillate is best continuously returned to the still so that a constant amount may be used. The optimum amount for this can be found by experiment.

My invention is best applied to mixtures which consist essentially of phenols and thiophenols relatively free from non-phenolic substances such as hydrocarbons, etc., if pure products are desired. It is desirable that the phenol-thiophenol mixture have an A. S. T. M. boiling range not greater than about 50° C. Otherwise the products may not be pure due to lower boiling phenols distilling at temperatures near to the boiling temperatures of normally higher boiling thiophenols which form azeotropes with water. However, the process may be applied to treatment of mixtures having broader boiling ranges, usually at a sacrifice of purity of the products produced.

*Example I*

To 2,069 gms. of a mixture containing 83.1% thiophenols and 16.9% alkylphenols, 629 gms. of glacial acetic acid and 613 gms. of water were added. The resulting mixture was distilled in a fractionating column seven feet high and 1.5 inches in diameter packed with ¼ inch cylindrical glass sections. The distillate was cooled whereupon it separated into two layers, a lower thiophenol layer and an upper water layer. The lower layer was withdrawn, and the upper layer was returned to the column as reflux. The distillation was continued until the distillate failed to further separate into two layers. At this point the collected lower distillate layer was analyzed and found to contain 1700 gms. of thiophenols and 36 gms. of alkylphenols, while the bottoms, excluding acetic acid and water, consisted of 292 gms. of alkylphenols containing less than 0.01% thiophenol sulfur.

*Example II*

To 155.5 gms. of an "acid oil" mixture boiling between 175 and 220° C. derived from petroleum and containing 9.2 gms. of thiophenol sulfur and the remainder alkylphenols, was added 50.8 gms. of morpholine and 50.6 gms. of water. The mixture was distilled through a six-plate column, the lower layer of the resulting distillate being withdrawn, and the upper layer being returned to the column as reflux. The distillation was allowed to proceed until there was but one phase present in the distillate. The lower layer of overhead product thus obtained contained 98.5% of the thiophenols charged, while the still bottoms excluding morpholine and water, consisted of morpholine and water, consisted of 87% of the charged alkylphenols and contained only 0.12% of thiophenol sulfur.

*Example III*

To 153.5 gms. of an "acid oil" boiling between 175 and 220° C., derived from petroleum, and containing 9.02 gms. thiophenol sulfur, 79.2 gms. of acetic acid and 61.2 gms. of water were added. The resulting mixture was distilled through a nine-plate column, with the lower layer of the distillate being withdrawn and the upper layer being returned to the column as reflux. The overhead product was found to contain 99.2% of the thiophenol sulfur charged while the bottoms, excluding acetic acid and water, consisted of 94% of the charged alkylphenols and contained only 0.063% of the thiophenol sulfur.

I claim as my invention:

1. A process for separating a mixture comprising phenols and thiophenols having similar vapor pressures including the step of fractionally distilling said mixture in the presence of a polar organic solvent and water under conditions to maintain liquid solvent in the residue of said distillation, whereby thiophenols and water pass overhead and phenols remain behind, said solvent being stable under the conditions of the process, being at least partially water-soluble and having a boiling temperature sufficiently higher than the resulting overhead product so as to be readily separable from said product by distillation.

2. The process of claim 1 wherein said solvent is water-soluble to the extent that 100 gms. of water dissolve at least 10 gms. of solvent at room temperature.

3. The process of claim 1 wherein said solvent forms weak complexes with phenols.

4. The process of claim 1 wherein said mixture has a boiling range not greater than 50° C.

5. A process for separating a mixture comprising phenols and thiophenols having similar vapor pressures including the step of fractionally distilling said mixture in the presence of a monocarboxylic acid having not more than four carbon atoms and water under conditions to maintain liquid acid in the residue of said distillation, whereby thiophenols and water pass overhead and phenols remain behind, said acid being stable under the conditions of the process, being at least partially water-soluble and having a boiling temperature sufficiently higher than the resulting overhead prdouct so as to be readily separable from said product by distillation.

6. A process for separating a mixture comprising phenols and thiophenols having similar vapor pressures including the step of fractionally distilling said mixture in the presence of acetic acid and water under conditions to maintain liquid acetic acid in the residue of said distillation, whereby thiophenols and water pass overhead and phenols remain behind.

7. A process for separating a mixture comprising phenols and thiophenols having similar vapor pressures including the step of fractionally distilling said mixture in the presence of formic acid and water under conditions to maintain liquid formic acid in the residue of said distillation, whereby thiophenols and water pass overhead and phenols remain behind.

8. A process for separating a mixture comprising phenols and thiophenols including the step of fractionally distilling said mixture in the presence of morpholine and water under conditions to maintain liquid morpholine in the residue of said distillation, whereby thiophenols and water pass overhead and phenols remain behind.

9. A process for separating a mixture comprising phenols and thiophenols having similar vapor pressures including the step of continuously fractionally distilling said mixture in a fractionation column, flowing a polar organic solvent and water down the column under conditions to result in a distillation residue containing liquid solvent, whereby thiophenols and water pass overhead, cooling the resulting distillate and separating it into two layers, an upper aqueous layer and a lower layer comprising thiophenols, separately withdrawing said layers, returning at least a portion of said aqueous layer to said distillation column as reflux, withdrawing from the bottom of said column said residue comprising phenols and solvent, separating said solvent from said phenols, returning the former to said distillation column for use in another cycle, said solvent being stable under the conditions of the process, being at least partially water-soluble and having a boiling temperature sufficiently higher than the resulting overhead product so as to be readily separable from said product by distillation.

10. A process for separating a mixture comprising phenols and thiophenols having similar vapor pressures including the step of batch fractionally distilling said mixture in the presence of a polar organic solvent and water under conditions to maintain liquid solvent in the residue of said distillation, whereby thiophenols and water pass overhead, cooling the resulting distillate and separating it into two layers, an upper aqueous layer and a lower layer comprising thiophenols, returning at least a portion of said aqueous layer to said distillation zone continuously, continuing the distillation until the overhead distillate ceases to separate into two layers upon cooling, then stopping the distillation and withdrawing a bottom product comprising phenols and solvent, said solvent being stable under the conditions of the process, being at least partially water-soluble and having a boiling temperature sufficiently higher than the resulting overhead product so as to be readily separable from said product by distillation.

11. The process of claim 1 wherein said solvent has a boiling temperature not substantially below the boiling temperature of water.

12. The process of claim 1 wherein said solvent does not form a low boiling azeotrope with water.

13. The process of claim 1 wherein said solvent forms weak molecular complexes with said phenols.

DANIEL B. LUTEN, JR.